United States Patent Office 3,631,101
Patented Dec. 28, 1971

3,631,101
p - [p - (THIONYLAMINO)BENZAMIDO]BENZOYL
CHLORIDE AND ITS HCl ADDITION PRODUCT
Josef Pikl, Glassboro, N.J., assignor to E. I. du Pont de
Nemours and Company, Wilmington, Del.
No Drawing. Filed Dec. 28, 1967, Ser. No. 694,123
Int. Cl. C07c 51/58, 10/88
U.S. Cl. 260—544 R                              2 Claims

ABSTRACT OF THE DISCLOSURE (I) p-[p-(thionylamino)benzamido] benzoyl chloride and (II) p-[p-aminobenzamido] benzoyl chloride hydrochloride and processes for their preparation. (I) is prepared by reacting p-aminobenzoic acid, p-thionylaminobenzoyl chloride and thionyl chloride in a reaction solvent. (II) is prepared by treating (I) with hydrogen chloride.

BACKGROUND p-Benzamide polymers are generally prepared from p-aminobenzoyl chloride hydrochloride monomer as described in U.S. Pat. No. 3,225,011. This monomer is difficult to obtain in high yields or purity. It is prepared by treating p-thionylaminobenzoyl chloride with hydrogen chloride.

The p-thionylaminobenzoyl chloride is prepared by reacting p-aminobenzoic acid with thionyl chloride (as taught by Graf and Langer, J. f. prakt. Chem. 148, 161–169 (1937)).

SUMMARY OF THE INVENTION

Novel compounds, p-[p-(thionylamino)benzamido] benzoyl chloride of the formula:

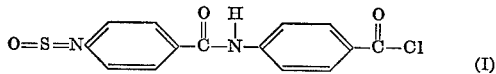

(I)

and p-[p-aminobenzamido]benzoyl chloride hydrochloride of the formula:

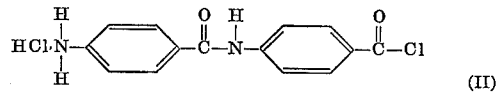

(II)

are produced according to this invention as follows:

(I) p-[p-(thionylamino)benzamido] benzoyl chloride is prepared by reacting substantially equimolar amounts of p-aminobenzoic acid, p-thionylaminobenzoyl chloride and thionyl chloride in a reaction solvent (preferably with a slight excess of thionyl chloride) at from about 40° C. to 85° C. for from about 1 to 6 hours; filtering; washing; and drying. As a preferred embodiment the reaction mixture is cooled and the excess reaction solvent is replaced by a purifying solvent selected from the group consisting of trichlorofluoromethane, 1,1,2-trichlorotrifluoroethane and 1,2-dichlorotetrafluoroethane before filtering; and (II) p-[p-aminobenzamido] benzoyl chloride hydrochloride is prepared by treating compound (I) with hydrogen chloride gas, preferably at about room temperature while (I) is slurried in the purifying solvent described above.

DETAILED DESCRIPTION OF INVENTION

As discussed above, Graf and Langer, J. f. prakt Chem. 148, 161–169 (1937), describe preparing p-thionylaminobenzoyl chloride by reacting p-aminobenzoic acid and thionyl chloride. It has now been surprisingly discovered that if p-aminobenzoic acid (or p-aminobenzoic acid hydrochloride) and thionyl chloride are reacted in the presence of p-thionylaminobenzoyl chloride, all being present in substantially equimolar amounts, together with an a reaction solvent, that substantially all of the p-aminobenzoic acid will be converted instead to p-[p-(thionylamino)benzamido] benzoyl chloride (I) and that only a minor additional amount of p-thionylaminobenzoyl chloride will be formed. Both p-[p-thionylamino) benzamido] benzoyl chloride and p-[p-aminobenzamido] benzoyl chloride hydrochloride (formed by treating the former with hydrogen chloride gas) are found to be especially valuable as intermediates for p-benzamide polymers (as shown in the examples below), offering process advantages over the use of p-aminobenzoyl chloride hydrochloride. An added advantage of the instant processes is that the crude p-thionylaminobenzoyl chloride may be employed, thereby obviating the necessity for purifying in order to prepare the p-aminobenzoyl chloride. HCl intermediate according to the general procedures taught by Graf and Langer (supra) and Riesz, Rez. Facultad Humanidad y Cienc., Montevideo 2, No. 3, 65–73 (1958).

The preparation of p-[p-(thionylamino)benzamido] benzoyl chloride (I) as above described is preferably carried out at from about 40° C. to 85° C. for 1 to 6 hours, depending on the temperature employed. The reaction solvent is generally excess thionyl chloride or carbon tetrachloride, preferably a slight excess of thionyl chloride of from about 1.2 to 4.0 moles per mole of p-aminobenzoic acid (or p-aminobenzoic acid hydrochloride) used.

The insoluble product (I) is then recovered by filtering; washed; and dried, preferably in a dry air or nitrogen atmosphere. The dried product has a melting point of approximately 172° C. As a preferred embodiment, after the reaction has ceased and before filtering, higher purity is achieved by removing the excess reaction solvent, e.g. by evaporation under vacuo, and slurrying the reaction mixture with a chlorofluorinated hydrocarbon solvent selected from trichlorofluoromethane, 1,1,2-trichlorotrifluoroethane or 1,2-dichlorotetrafluoroethane as more fully discussed in my concurrently filed, copending, application S.N. 694,058, filed Dec. 28, 1967. The product is then recovered by filtering; washed with the chlorofluorinated solvent; and dried in a dry air or nitrogen atmosphere.

p - [p - Aminobenzamido] benzoyl chloride hydrochloride (II) is formed by treating the above reaction product (I) with hydrogen chloride gas, preferably at about room temperature, before filtering, while in a slurry in the chlorofluorinated hydrocarbon solvent, followed by filtering, washing and drying as described above.

Alternatively, reaction product (I), after filtering, may be slurried in anhydrous diethyl ether for further purification. The hydrochloride product (II) may then be formed by treating (I) with hydrogen chloride gas while slurried in the ether.

EXAMPLES

The following examples described the invention in further detail. These examples are intended to be merely illustrative of the invention and not in limitation thereof. All parts are by weight unless otherwise indicated.

EXAMPLE 1

Preparation of p-[p-(thionylamino) benzamido] benzoyl chloride 100 parts (0.5 mole) of p-thionylaminobenzoyl chloride, distilled, is dissolved in 150 parts (1.26 mole) thionyl chloride and then 69 parts (0.5 mole) of pulverized p-aminobenzoic acid is added. The reaction mixture is gradually warmed to 50° C. when a slow gas evolution begins. The thick reaction mixture is thinned out with 80 parts (0.67 mole) thionyl chloride and heated to 82°

C. where it is held for 2 hours. Part of the excess thionyl chloride is then evaporated in vacuo and the reaction slurry diluted with 500 parts of 1,1,2-trichlorotrifluoroethane. The insoluble solid is then filtered and washed with the 1,1,2-trichlorotrifluoroethane. After drying, 87 parts of product is obtained which is essentially the expected compound. It contains 10.5% S which, calculated for $C_{14}H_9O_3N_2ClS$ is 9.99%. Essentially all the p-aminobenzoic acid used is converted to p-[p-(thionylamino) benzamido] benzoyl chloride. The solvent extract, on evaporation in vacuo, gives a residue of 102 parts p-thionylaminobenzoyl chloride which crystallizes on cooling.

In this reaction, essentially the same results may be achieved by replacing the p-aminobenzoic acid with an equivalent molar amount of p-aminobenzoic acid hydrochloride.

The crude reaction product is alternatively purified by extraction with anhydrous diethyl ether to give a pure light yellow product having a melting point of 177° C. (rapid heating).

EXAMPLE 2

Conversion of p-[p-(thionylamino) benzamido] benzoyl chloride to p-[p-aminobenzamido] benzoyl chloride hydrochloride The p-[p-(thionylamino) benzamido] benzoyl chloride compound, slurried in anhydrous diethyl ether as in Example I, is treated with anhydrous hydrogen chloride at 25° C. p-[p-aminobenzamido] benzoyl chloride hydrochloride is recovered as a colorless white solid.

*Analysis.*—Calculated for $C_{14}H_{12}O_2Cl_2N_2$ (percent): C, 54.2; H, 3.9; N, 9.04; Cl, 22.86; S, nil.

Find (percent): C, 54.5; H, 3.7; N, 9.1; Cl, 21.7; S, nil.

EXAMPLE 3

Polymerization of p-[p-(thionylamino)benzamido] benzoyl chloride to poly(p-benzamide)

5 parts of p-[p-(thionylamino) benzamido] benzoyl chloride is dissolved in 25 parts of tetramethylurea containing 2% lithium chloride. The mixture is permitted to stand at room temperature in an open flask for 3 days during which time it becomes very viscous. The reaction is then poured into water and mixed in a Waring Blendor. The product is isolated and washed 3 times with water and once with isopropyl alcohol to yield poly(p-benzamide) which, after drying, exhibits an inherent viscosity of 1.06 as determined in a capillary viscometer at 30° C. using concentrated sulfuric acid as the solvent.

EXAMPLE 4

Polymerization of p-[p-aminobenzamido] benzoyl chloride hydrochloride to poly (p-benzamide)

A reaction mixture comprising 1.5 grams (0.0048 mole) of p-[p-aminobenzamido] benzoyl chloride hydrochloride and 10 ml. of tetramethylurea containing 2% lithium chloride is permitted to stand at room temperature overnight. The viscous reaction mixture is then agitated with water in a Waring Blendor, the poly (p-benzamide) isolated, washed 3 times with water and once with isopropyl alcohol, and dried. Inherent viscosity, determined as in Example 3, is 0.85.

The foregoing detailed description has been given for clearness of understanding only and no unnecessary limitations are to be understood therefrom. The invention is not limited to the exact details shown and described, for obvious modifications will occur to those skilled in the art.

What is claimed is:
1. p-[p-(thionylamino)benzamido] benzoyl chloride.
2. p-[p-aminobenzamido] benzoyl chloride hydrochloride.

References Cited

UNITED STATES PATENTS

| 3,162,684 | 12/1964 | Frick | 260—556 |
| 2,763,678 | 9/1956 | Grimme | 260—471 |

OTHER REFERENCES

Greenstein, Chemistry of Amino Acids, p. 648, QP801 A5G7.

LORRAINE A. WEINBERGER, Primary Examiner

E. J. GLEIMAN, Assistant Examiner

U.S. Cl. X.R.

260—78 R